(12) United States Patent
Uehira et al.

(10) Patent No.: US 6,172,314 B1
(45) Date of Patent: Jan. 9, 2001

(54) AUTOMOTIVE COMBINATION SWITCH

(75) Inventors: Kiyotaka Uehira; Shusaku Kawasaki, both of Osaka (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/230,157

(22) PCT Filed: May 19, 1998

(86) PCT No.: PCT/JP98/02190

§ 371 Date: Jan. 20, 1999

§ 102(e) Date: Jan. 20, 1999

(87) PCT Pub. No.: WO98/53471

PCT Pub. Date: Nov. 26, 1998

(30) Foreign Application Priority Data

May 20, 1997 (JP) .................................................... 9-129258
May 20, 1997 (JP) .................................................... 9-129265

(51) Int. Cl.[7] .................................................... H01H 9/00
(52) U.S. Cl. .................................................... 200/61.54
(58) Field of Search ............................. 200/4, 17 R, 18, 200/61.27–61.36, 61.54, 332, 335

(56) References Cited

U.S. PATENT DOCUMENTS

| | | | |
|---|---|---|---|
| 5,182,422 | * | 1/1993 | Botz et al. .......................... 200/61.54 |
| 5,895,899 | * | 4/1999 | Sano .................................. 200/61.54 |
| 5,936,215 | * | 8/1999 | Masuda et al. ..................... 200/61.3 |
| 5,977,494 | * | 11/1999 | Sano et al. ......................... 200/61.54 |
| 5,977,495 | * | 11/1999 | Akimoto ............................ 200/61.54 |
| 6,025,565 | * | 2/2000 | Miyase et al. ..................... 200/61.28 |

FOREIGN PATENT DOCUMENTS

| | | | |
|---|---|---|---|
| 62-26842 | 2/1987 | (JP) | ............................... H01H/25/04 |
| 9-120754 | 5/1997 | (JP) | ............................... H01H/25/04 |

OTHER PUBLICATIONS

Japanese language search report for Int'l Appln No. PCT/JP98/02190 dated Aug. 18, 1998.
English language translation of Japanese language search report Dated Aug. 18, 1998.

* cited by examiner

*Primary Examiner*—Michael Friedhofer
(74) *Attorney, Agent, or Firm*—Ratner & Prestia (57) ABSTRACT

An automotive combination switch having a simple relay connector structure between switch units, comprising a reduced number of components and excelling in assemblability and reliability. The combination switch comprises a light control switch unit (1) containing a plurality of function switches housed in a case having a rib to be fitting to a groove (5a) of a main body (5), an elastic mounting knob (7a) and a stopper peg (8a) provided thereon, also provided in the lower part of the case is a fixed connector (10a) for delivering signals from the switches outside; and a wiper control switch unit (2) containing a plurality of function switches housed in a case having likewise a rib, a mounting knob (7b), a stopper peg (8b) provided thereon and a fixed connector (10b). An interconnection lead wire (17) having movable connectors (19a, 19b) at both ends is attached to the main body (5) with a mobility to be engaged with respective fixed connectors (10a, 10b) of the switch units when mounted to the main body (5).

8 Claims, 10 Drawing Sheets

AUTOMOTIVE COMBINATION SWITCH

This application is a U.S. National phase application of PCT International application PCT/JP98/02190.

TECHNICAL FIELD

The present invention relates to an automotive combination switch incorporating switching mechanisms such as light control switch unit, wiper control switch unit, etc. to be installed on an automotive steering column.

BACKGROUND ART

Figure 14:
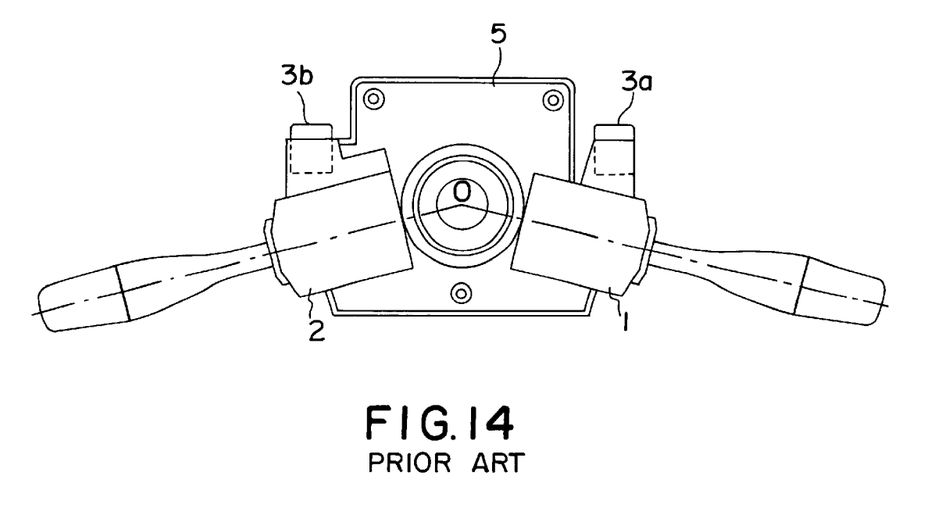
FIG. 14 shows the structure of a prior art automotive combination switch, as viewed from the bottom.

A prior art combination switch is described in the following with reference to FIG. 14 and FIG. 15. FIG. 14 shows the structure of a conventional automotive combination switch as viewed from the bottom, FIG. 15 is a side view of the automotive combination switch.

Figure 15:
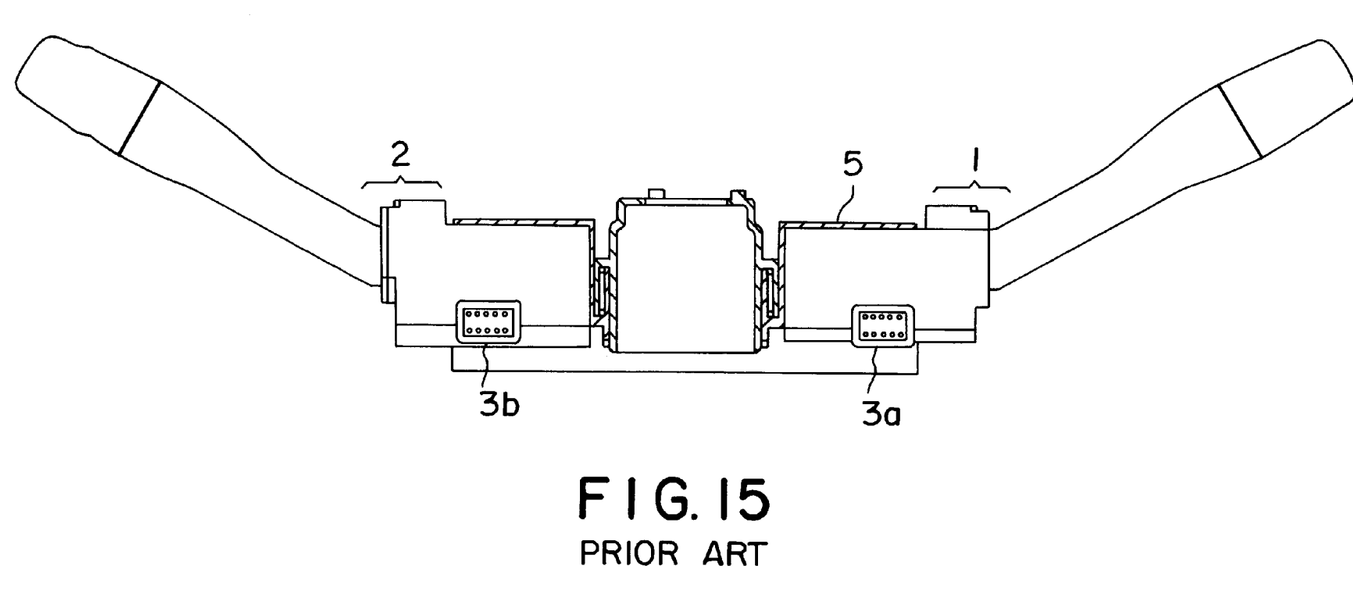
FIG. 15 is a side view of the combination switch.

Referring to FIG. 14 and FIG. 15, a light control switch unit 1 houses in it a light switch, a dimming/passing switch, a turning switch and various other switches of the category. A wiper control switch unit 2 houses in it various function switches such as a front windshield wiper switch, a rear windshield wiper switch, a front windshield washer switch, and other switches related to the wiper. Electric signals from the respective light control switch unit 1 and the wiper control switch unit 2 are delivered outside through output connectors 3a, 3b attached to the switch units 1, 2, to be supplied severally to a circuit outside the combination switch (a circuit in an automobile). Numeral 5 represents a main body.

Recently, more and more switching functions are being incorporated in an automotive combination switch, and the relevant signals are processed digitally. In line with such trend, various combination switches of a new type have been developed. These switches deliver the electric signals outside after digitally processing them inside the switch; viz. these are the combination switches for multiplex communication use. In such multiplex communication switches, signals from the light control switch unit 1 and the wiper switch unit 2 are processed altogether in a digital circuit (incorporated in either one of the switch units), and then delivered to an automobile side. Therefore, the number of connectors and the pin counts needed may be decreased as compared with those in a system of FIG. 14 and FIG. 15. However, the combination switches for multiplex communication require a new structure for the electrical coupling among the two units. And, because each of the switch units is assembled in an independent block configuration for easy mounting/detaching from the main body, reliable means for interconnection among the switch units is needed, which accomplishes a reliable coupling during mounting operation absorbing dimensional dispersion of constituent parts or that caused by practical handling in the mounting operation.

DISCLOSURE OF THE INVENTION

The present invention aims to offer an automotive combination switch, with which the mounting operation may be accomplished easily and reliably. The combination switch comprises an relay connector, and is made of a reduced number of components in a simplified structure.

An invented automotive combination switch comprises a light control switch unit containing a plurality of function switches such as a turning switch, a dimming switch and a light switch housed in a case having a rib to be fitting to a groove of main body, an elastic mounting knob, and a stopper peg mounted thereon, the case being provided at the lower part with a fixed connector for delivering signals from the switches outside; a wiper control switch unit containing a plurality of function switches such as a wiper switch, a washer switch housed in a case likewise having a rib, an elastic mounting knob, a stopper peg provided thereon and a fixed connector; and an interconnection lead wire attached to the main body with a mobility, the lead wire having at both ends a movable connector which is to be engaged with respective fixed connectors of the switch units when mounted to the main body.

With the above structured combination switch, even if the positioning the respective fixed connectors of light control switch unit and the wiper control switch unit when mounted to the main body is dispersed due to dispersion in the mounting dimensions, etc. the movable connector of the relay connector which has been attached to the main body with a certain mobility can adapt its location to the fixed connector of switch unit for coupling. Therefore, such troubles as twisted coupling or uninsertability among the connectors may be avoided. Furthermore, as the relay connector has been made readily available with commercial lead wires, it may be presented at low cost with a high reliability, without requiring any special moulds or components.

BEST MODE FOR CARRYING OUT THE INVENTION (Embodiment 1)

A first exemplary embodiment of the present invention is described in the following with reference to FIG. 1 to FIG.

6. FIG. 1 shows the structure of an invented automotive combination switch, as viewed from the bottom, FIG. 2 is a side view of the combination switch, FIG. 3 is a cross sectional plane view showing details of a movable connector, FIG. 4 is a cross sectional side view of the movable connector, FIG. 5 is a front view showing a holder portion of the movable connector, FIGS. 6(a), (b) are drawings used to describe the coupling action among the movable connector and the fixed connector.

Figure 1:
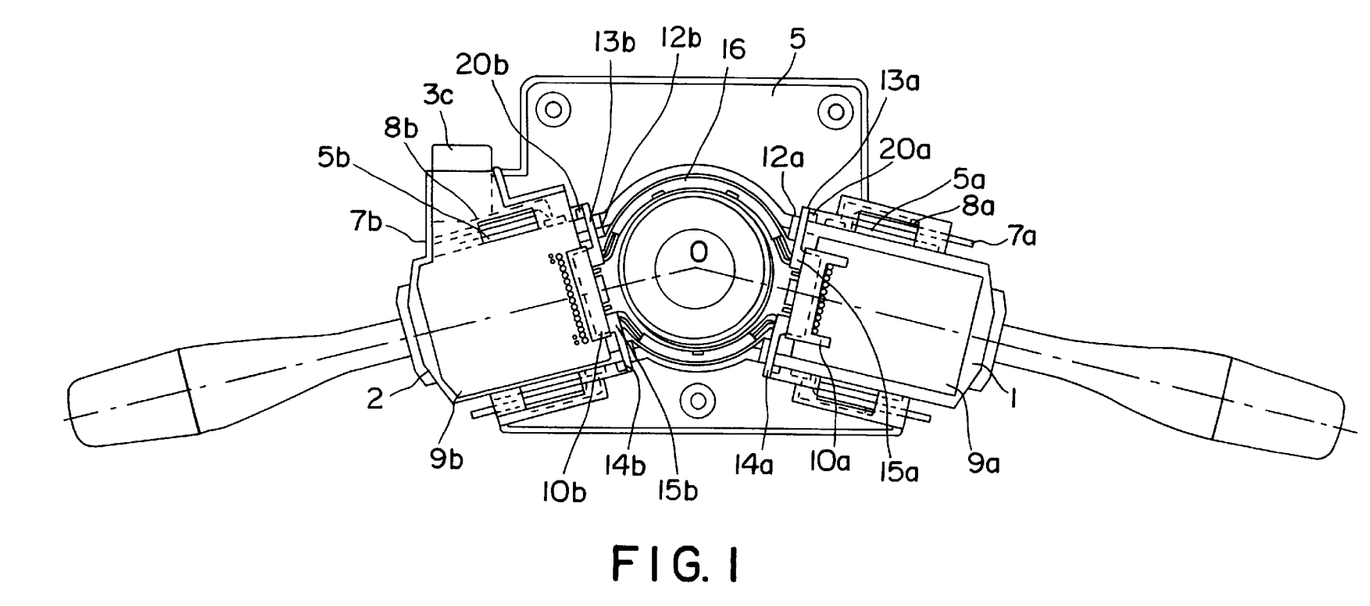
FIG. 1 shows the structure of an invented automotive combination switch, as viewed from the bottom, in accordance with a first exemplary embodiment.
Figure 2:
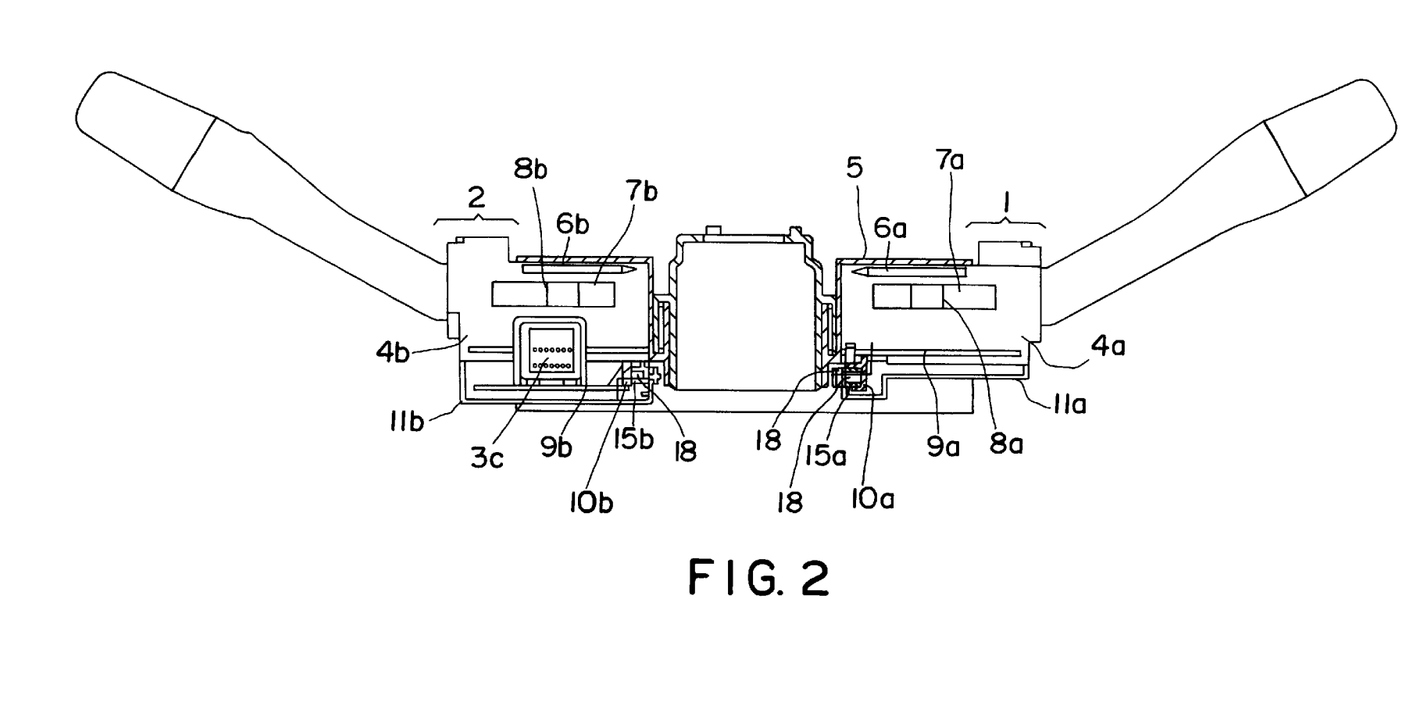
FIG. 2 is a side view of the combination switch.

Referring to FIG. 1 and FIG. 2; provided in the side of a resin-molded case 4a, 4b for light control switch unit 1 and wiper control switch unit 2 is a lib 6a, 6b which fits to a groove 5a, 5b of a main body 5 for positional orientation, a mounting knob 7a, 7b made of an elastic resin which is shaped in a form U so as to provide an elastic force by making use of elasticity of the resin, and a stopper peg 8a, 8b provided thereon in a certain specific place, all of the above items have been made as a single molded structure. In the bottom of each switch unit at the inserting end to the main body 5, a fixed connector 10a, 10b soldered to a printed board 9a, 9b is provided facing towards an open portion of the case 4a, 4b, for delivering the signals from function switches in each of the switch units out. The printed board 9a, 9b and the fixed connector 10a, 10b are protected by a cover 11a, 11b.

Figure 3:
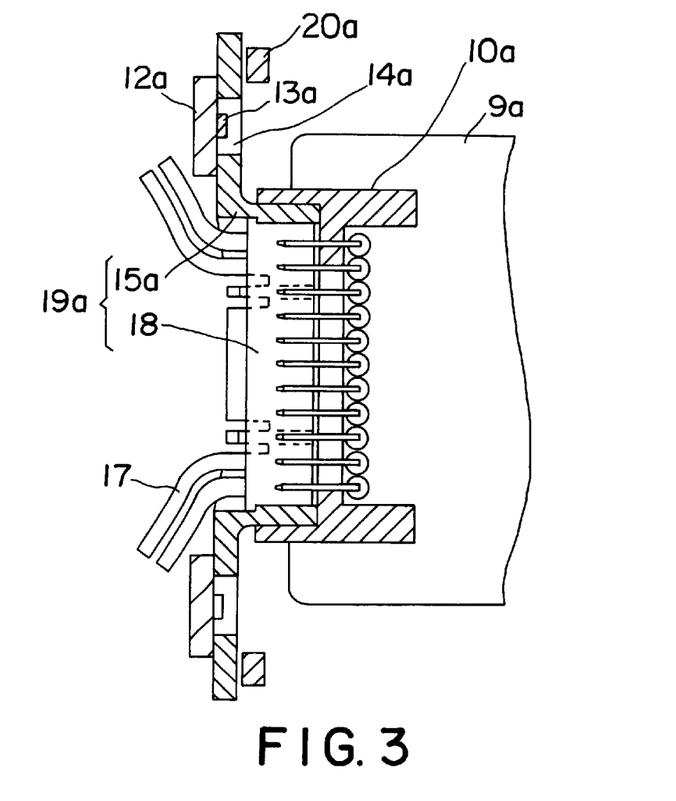
FIG. 3 is a cross sectional plane view showing details of a connector of the combination switch.
Figure 4:
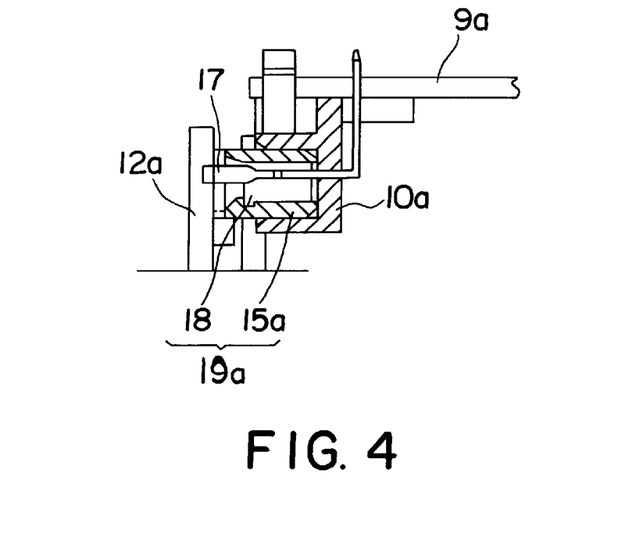
FIG. 4 is a cross sectional side view showing the connector in detail.
Figure 5:
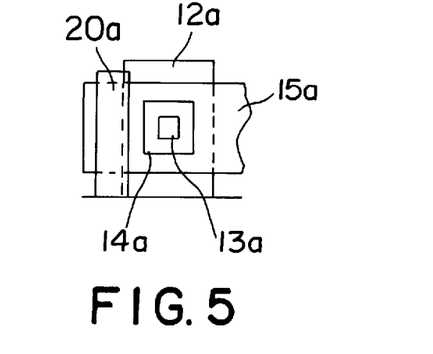
FIG. 5 is a front view showing the structure of a holder and a stopper peg, FIGS. 6(a)+(b) is drawings used to describe the coupling action of the connector.
Figure 6A:
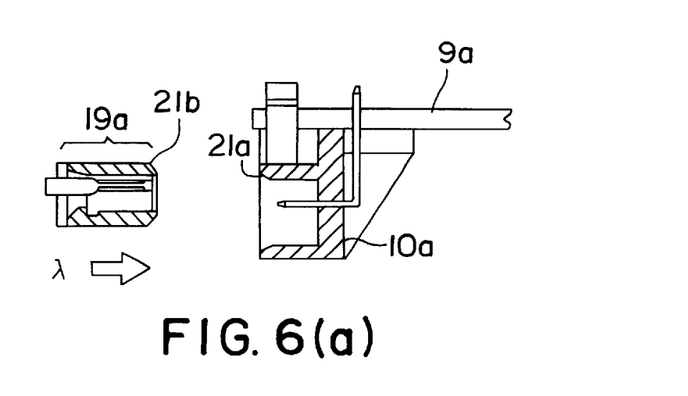
Figure 6B:
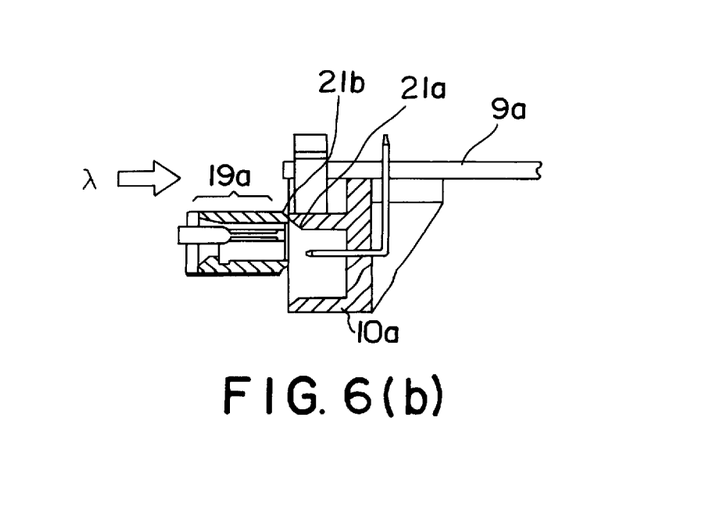

FIG. 3 and FIG. 4 show the movable connector of FIG. 1 and FIG. 2 further in detail.

In FIG. 1 to FIG. 4; the movable connector 19a, 19b is comprised of a holder 15a, 15b having at both ends a hole 14a, 14b to be engaged movable with a protrusion 13a, 13b of a holding portion 12a, 12b which has been provided to form an integral part of the main body 5, and a housing 18 which is held fixed by an elastic nail 16a, 16b provided in the holder 15a, 15b and houses in it a terminal section of interconnection lead wire 17 caulked thereto. The interconnection lead wire 17 having the movable connector 19a, 19b at both ends is disposed with the protrusion 13a, 13b fitted to the hole 14a, 14b, so as it faces to a position corresponding approximately to the fixed connector 10a, 10b of switch unit 1, 2. As the movement of the movable connector 19a, 19b is held restricted within a clearance created among the protrusion 13a, 13b and the hole 14a, 14b, the movable connector 19a, 19b does not fall off the main body 5.

The main body 5 and the holder 15a, 15b are coupled by means of press-fitting, etc. of the holding portion 12a, 12b taking advantage of the elasticity of the resin. At the other side of the holder 15a, 15b, opposing to the holding portion 12a, 12b is a stopper 20a, 20b provided as an integral part of the main body 5, for retaining the movable connector 19a, 19b in a case when a switch unit is withdrawn.

In the present exemplary embodiment 1, a digital circuit has been disposed in the wiper switch unit 2. Therefore, an output connector 3 is provided in the wiper switch unit 2 for delivering signals to a circuit in automobile end.

The connection of the relay connector with respective switch units is described in the following referring to FIG. 1, FIG. 2, FIG. 5 and FIG. 6.

Each of the switch units is held mounted to a specified position through insertion of the rib 6a, 6b of case 4a, 4b along the groove 5a, 5b of the main body. During the insertion of switch unit into the main body 5, the stopper peg 8a, 8b is elastically hooked to a latching wall of main body 5 by an elasticity of the mounting knob 7a, 7b, and the switch unit is firmly held by the main body without play; when, the movable connector 19a, 19b and the fixed connector 10a, 10b being kept inserted.

Generally speaking, positioning of the fixed connector 10a, 10b of switch unit is dispersed due to such factors as a play in the fixing of the case 4a, 4b to the main body 5, displaced fixing of the fixed connector 10a, 10b to the printed board 9a, 9b, displaced fixing of printed board 9a, 9b to the case 4a, 4b, a dispersion in the dimensions of constituent components, etc.; as a result, it does not always coincide with the location of the movable connector 19a, 19b attached to the main body. The movable connector 19a, 19b of the present embodiment 1 is supported by the protrusion 13a, 13b with respect to the main body 5, and does not fall off the body; however, because it is supported so as it can move for a distance equivalent to the dimensional difference among the hole 14a, 14b and the protrusion 13a, 13b, the coupling of connectors is consummated by adapting the location to be suitable to the position of fixed connector 10a, 10b, absorbing the dispersion in the positioning.

When a switch unit is withdrawn, the movable connector 19a, 19b for interconnection does not move in the withdrawing direction, because the holder 15a, 15b is restricted by the stopper 20a, 20b. Thus, the fixed connector 10a, 10b of the switch unit is withdrawn, while the movable connector 19a, 19b is retained.

The above structured movable connector 19a, 19b realizes a reliable structure for a relay connector of an invented automotive combination switch; with which the coupling and decoupling of connection may be accomplished reliably, without making the level of dimensional requirements for the constituent components and units more stringent.

The connectors may be coupled easier and surer by providing a guide portion 21a, 21b on the encountering ridges of at least one among the fixed connector 10a, 10b of switch unit, and the movable connector 19a, 19b of relay connector, the guide portion 21a, 21b being large enough to cover a displacement value equal to the amount of relative displacement between the connectors caused by dispersion. The movable connector 19a, 19b for interconnection may be guided by the guide portion 21a, 21b to be smoothly inserted for a sure coupling.

Although the hole 14a, 14b has been provided in the holder 15a, 15b, while the protrusion 13a, 13b in the main body, in the above exemplary embodiment 1, the same effects may be obtained by an opposite structuring.

In the above embodiment 1, the movable connector 19a, 19b has been fabricated into a single piece component out of a holder 15a, 15b and a housing 18 for holding terminals, each of which has been provided as a separate component, by inserting the housing 18 into the holder 15a, 15b, and preventing the housing 18 from falling-off by a resin nail 16a, 16b provided in the holder 15a, 15b. However, the parts count may be reduced and the assembly operation may also be further simplified if the housing 18 is formed with a resin together with a holder 15a, 15b having a hole 14a, 14b at both ends, completing a movable connector.

(Embodiment 2)

A second exemplary embodiment of the present invention is described in the following referring to FIG. 7 to FIG. 13.

Figure 7:
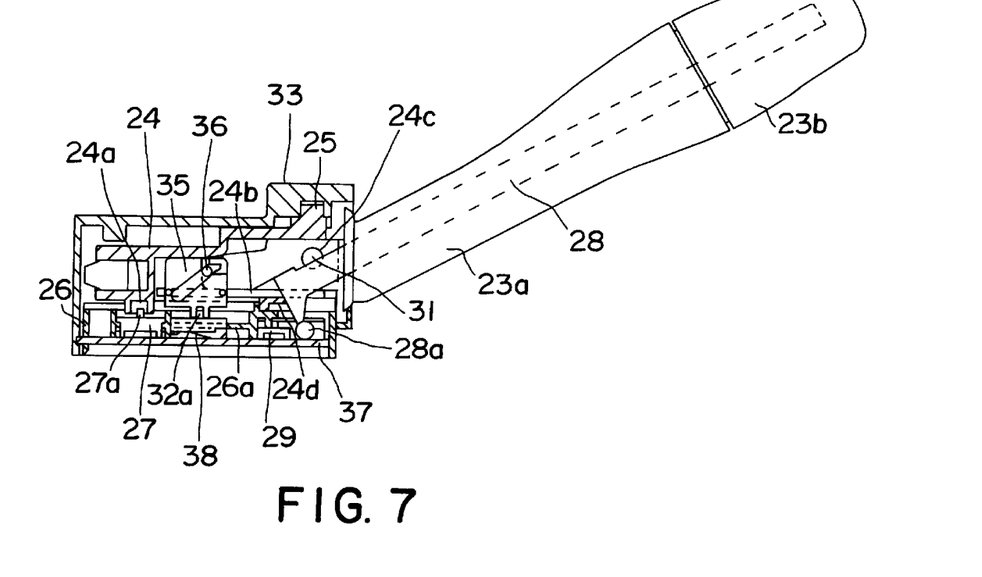
FIG. 7 is a cross sectional side view of an invented automotive combination switch, showing a practical structure of the switch unit in detail.
Figure 8:
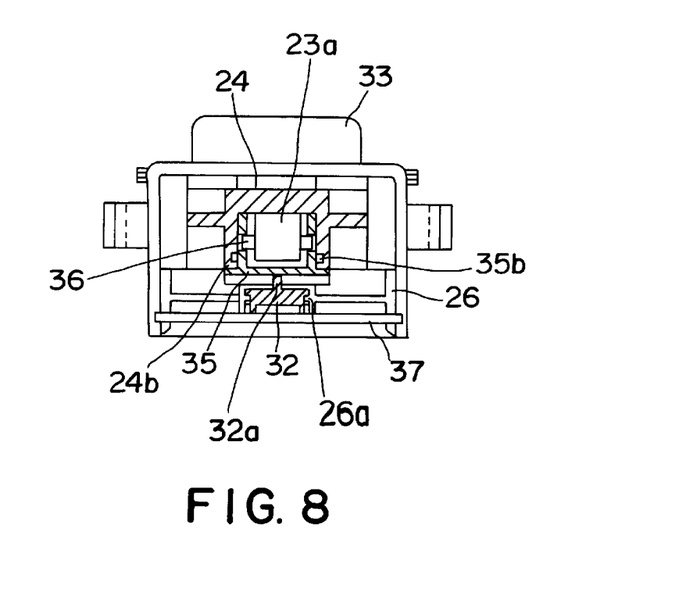
FIG. 8 is a vertical cross sectional view showing the structure of the switch unit.
Figure 9:
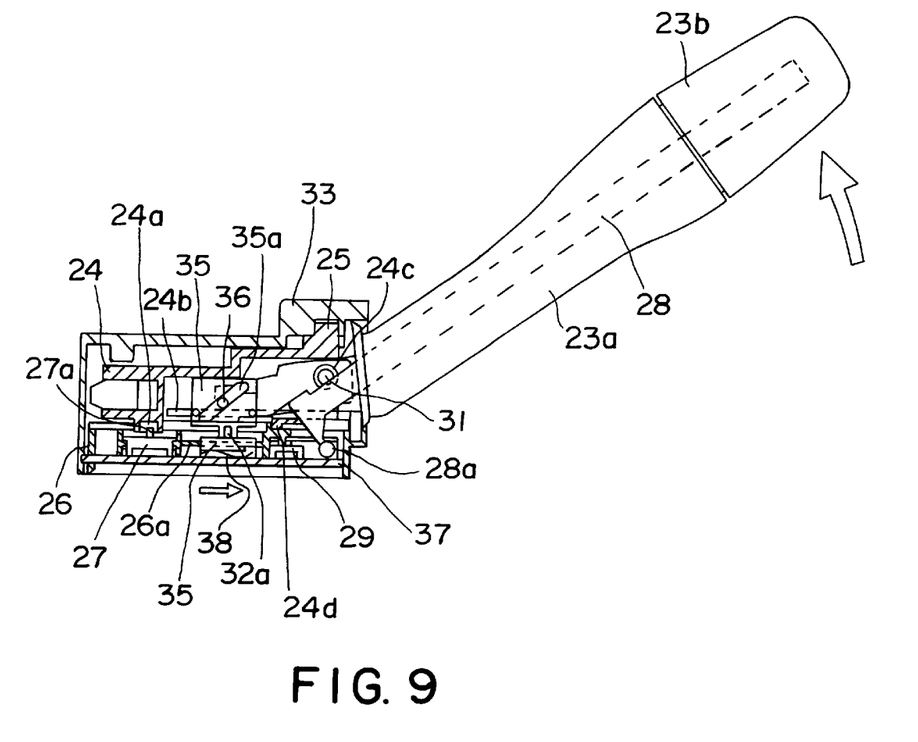
FIG. 9 is a cross sectional side view of the switch unit showing the vertical action of the switch unit.
Figure 10:
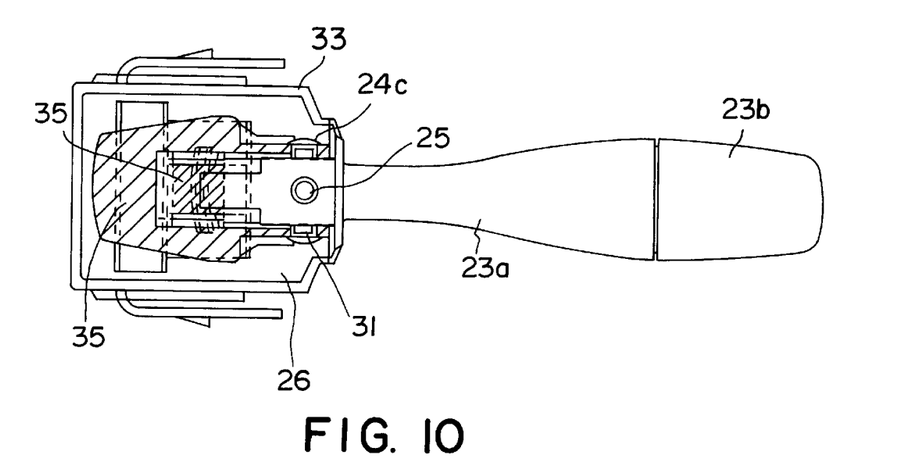
FIG. 10 is a plane view showing the structure of the switch unit.
Figure 11:
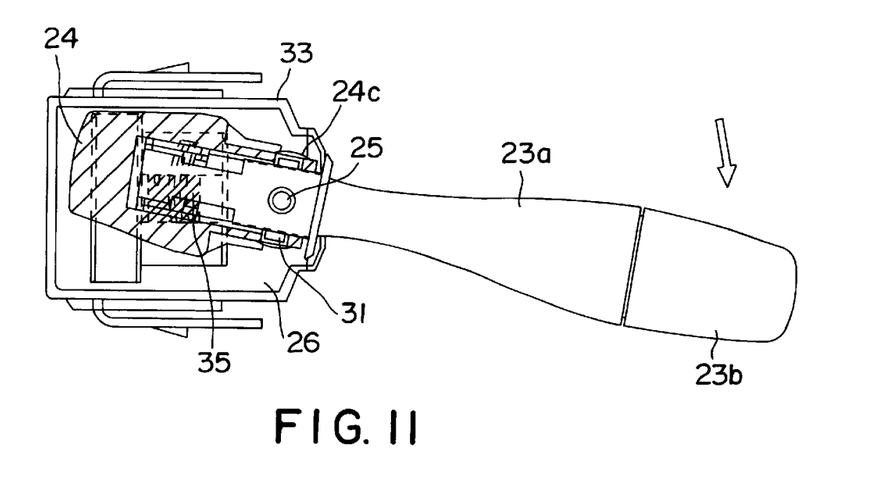
FIG. 11 is a plane view showing the horizontal action of the switch unit.
Figure 12:
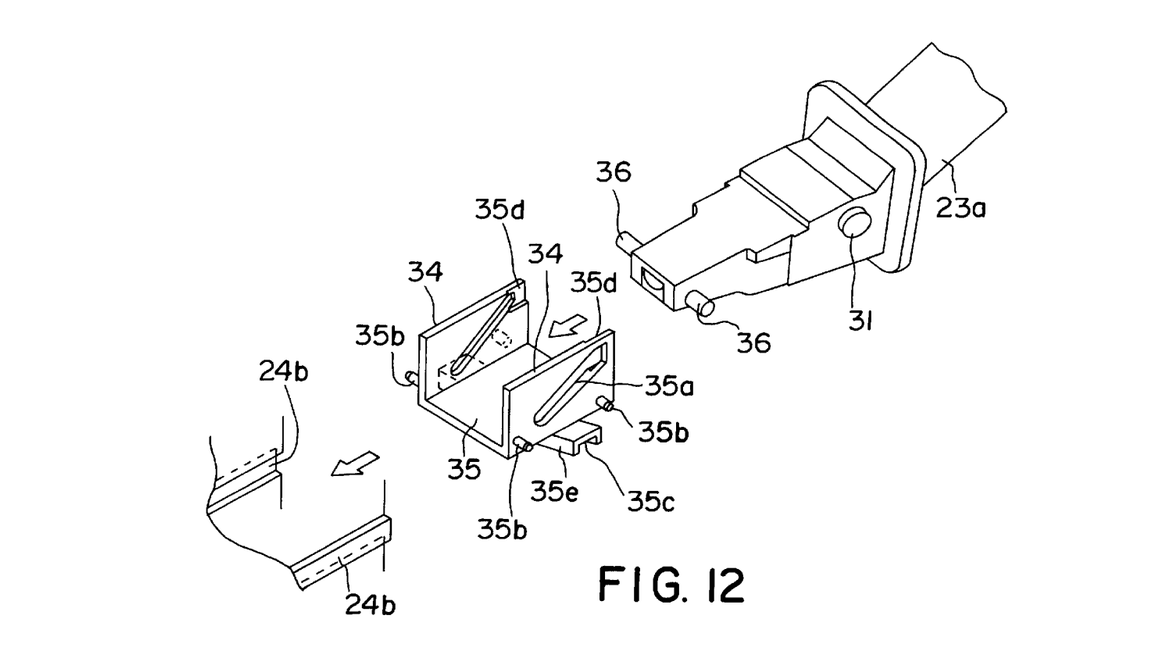
FIG. 12 is an exploded perspective view of the switch unit used to describe an operating element and insertion thereto of a driving axle of knob.
Figure 13:
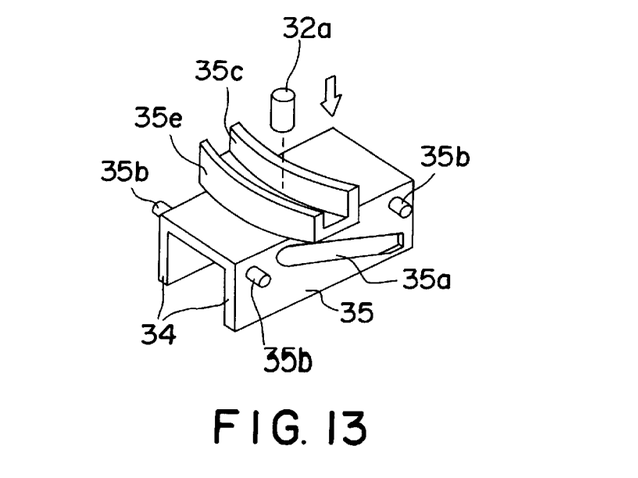
FIG. 13 is a perspective view showing the reverse surface of the operating element.

FIG. 7, FIG. 8 show a cross sectional side view and a vertical cross sectional view, respectively, of a switch unit, FIG. 9, FIG. 11 are a cross sectional side view and a plane view, respectively, used to describe the operation of switch unit, FIG. 10 is a plane view of the switch unit, FIG. 12 is an exploded perspective view used to describe an operating element and insertion thereto of a driving axle of knob, FIG. 13 is a perspective view of the operating element viewed from the bottom.

Because the mounting structure of the light control switch unit and the wiper control switch unit shown in the embodiment 2 remains the same as that of embodiment 1, a detailed description will not be repeated. In the related drawings, those components having the same functions are represented by using same symbols.

In the following, the internal structure of light control switch unit 1 and wiper control switch unit 2 are described in detail with reference to FIG. 7 to FIG. 13.

In FIG. 7 to FIG. 13, numeral 33 denotes a case, 23a is a fixed knob, 23b is a movable knob. The movable knob 23b is fixed on an axle 28, the axle is penetrating through a hole in the center of the fixed knob 23a and slidably coupled at the driving portion 28a of a ball shape provided at he tip end with a slider 29 of light switch housed in the case 33. At an end of the fixed knob 23a opposite to the movable knob 23b, a vertical pivotal axle 31 to be rotatably supported by a hole provided in a sliding element 24 is provided, which pivotal axle 31 is fitted in a pivotal hole 24c of sliding element 24. At the further end of the fixed knob 23a, a driving axle 36 is provided to be engaged slidably with a slant slit hole 35a of both side walls 34 of an operating element 35. The operating element 35 and the fixed knob 23a are coupled via the driving axle 36.

At both side walls 34 of the operating element 35, a guide axle 35b is provided to be engaged slidably with a guide groove 24b which has been provided in a horizontal direction in the side wall of sliding element 24. This restricts movement of the operating element 35 to the horizontal direction. The above sliding element 24 is supported by a horizontal pivotal axle 25 and a lower pivotal axle 24d between the case 33 and an intermediate cover 26 to be freely rotatable in a horizontal plane; also provided at the extreme end is a hollow groove 24a which is to be engaged with a turning switch axle 27a of a turning switch slider 27.

On the outer bottom surface of said operating element 35, a circular arc groove 35c having a U shape cross section is provided to be engaged with a dimming switch axle 32a of dimming switch slider 32. The dimming switch slider 32 is supported by a guide rib 26a provided in the intermediate cover 26 and restricted to move in a horizontal direction. Each slider of the respective switches is slidably supported between the intermediate cover 26 and the printed board 37, each slider is provided with a contact element 38 (only that of dimming switch is shown), and the sliding element 38 slides over the surface of printed board 37 to open and close a pattern formed thereon.

Operation of a switch unit of the above structure is described in he following with reference to FIG. 9 and FIG. 11. The switching operation in the structure caused by a motion of the fixed knob 23a in a horizontal plane is described later. The switching operation caused by a motion of the fixed knob 23a in a vertical plane, which being related to the present invention, is described in the first place.

When fixed knob 23a is pulled vertically up as indicated in FIG. 9, the driving axle 36 provided at the far end of fixed knob 23a rotates with the vertical pivotal axle 31 as the fulcrum, the pivotal axle being provided in an end of the fixed knob 23 and engaged with the pivotal hole 24c of sliding element 24. The driving axle 36 pushes the slant slit hole 35a of the side wall of operating element 35.

The operating element 35 has been engaged by the guide groove 24b in the side of sliding element 24 and the guide axle 35b so as it can move only in a horizontal direction guided by the guide groove 24b of sliding element 24 (ref. FIG. 8). The driving axle 36 moves sliding in the slant slit hole 35a in a rotating motion, and the operating element 35 makes a horizontal shift. A circular arc portion 35e, containing the groove having a U shape cross section 35c, provided at a lower part of the operating element 35 shifts likewise. A dimming switch axle 32a of dimming switch slider 32 having contact element 38 is engaged with the groove having a U shape cross section; as a result, the dimming switch slider 32 moves along the guide rib 26a of intermediate cover 26 along with the movement of operating element 35, and the contact element 38 opens/closes a pattern on the printed board 37.

As shown in FIG. 10 and FIG. 11, the sliding element 24 sometimes make a rotating shift for the purpose of other switching operation, centered by the horizontal pivotal axle 25 and lower pivotal axle 24d within a horizontal plane. Although the sliding element 24 as well as the operating element 35 engaged with it likewise make the rotating shift, the dimming switch axle 32a of dimming switch slider 32 does not make the shift, and keeps staying in the position because the groove having a U shape cross section 35c disposed in the lower part of operating element 35 has been shaped in a circular arc form as shown in FIG. 13. If the fixed knob 23a is operated in the state as described above, the same movement as described earlier takes place to perform the present switching instruction, independent of other switching operation. Thus, the motion of the operating element caused by a vertical motion of the fixed knob 23a which shifts a sliding element always remains in a horizontal plane, without making any up/down motion. This may flatten the whole structure of a switch.

Furthermore, insertion of the driving axle 36 of fixed knob 23a into the slant slit hole 35a of operating element 35 may be made easier, if the operating element 35 is formed by resin molding or other such method and a guide hollow 35d is provided at the inserting end for accepting the driving axle 36 of fixed knob 23a, in a manner to make the span slightly narrower than the width of driving axle 36, as shown in FIG. 12. The driving axle 36 may be put into engagement with the slant slit hole 35a of operating element 35 easily by taking advantage of elasticity of the resin side wall of operating element 35. This may contribute to increase the productivity in assembly process.

The turning switch may be put into operation by rotating the fixed knob 23a in a horizontal plane, as shown in FIG. 11; the sliding element 24 fitted to the end of fixed knob 23a rotates around the horizontal pivotal axle 25 to put the turning switch slider 27, which has been slidably attached to the intermediate cover 26, into action.

When a movable knob 23b attached rotatably at an operating end of the fixed knob 23a is rotated, an axle 28 fixed to the movable knob 23b rotates to move a light switch slider 29. Thus the high/low beam switchover is performed.

INDUSTRIAL APPLICABILITY

The present invention offers a reliable automotive combination switch having an relay connector between the units, the structure of which being simple containing less component counts, and a high productivity during assembly operation is assured.

Also offered by the present invention is a structure in which a rotating action of a knob causes a horizontal motion of an operating element. With the above structure, an automotive combination switch may be made more compact and flat.

What is claimed is:

1. An automotive combination switch comprising:

a light control portion comprising a turning switch, a dimming switch and a light switch housed in a first case, said first case having a first rib, a first elastic mounting knob and a first stopper peg provided thereon, said first rib connecting said first case to a first groove of a main body, and said first case being provided with a first fixed connector for delivering signals from said switches:

a wiper control portion comprising a wiper switch and a washer switch housed in a second case, said second case having a second rib, a second plastic mounting knob, a second stopper peg provided thereon, said second rib is connecting said second case to a second groove of said main body, and said second case being provided with a second fixed connector; and an interconnection lead wire attached to said main body said lead wire having at least one movable connector, said at least one moveable connector is engaged with the first and second fixed connectors of said light and wiper control portions mounted to said main body.

2. The automotive combination switch of claim 1, wherein said main body comprises a holding portion and a protrusion provided thereon; said movable connector is provided with a hole to allow movement with respect to said protrusion disposed opposing to said holding portion; and said main body also comprises a stopper for restricting, when said light and wiper control portions are withdrawn, movement of said movable connector in a withdrawing direction.

3. The automotive combination switch of claim 2, wherein a guide portion for guiding said movable connector is included with at least one of said first and second fixed connectors and said movable connector.

4. The automotive combination switch of claim 2, wherein said movable connector comprises a housing for keeping a terminal portion of said interconnection lead wire in; and a holder equipped with a nail for holding the housing, said holder provided with a protrusion and a hole for support in relation to the main body.

5. The automotive combination switch of claim 2, wherein said movable connector comprises a protrusion and a hold for support and mobility in relation to the main body, said protrusion and hold formed over at least a portion of a housing for keeping a terminal potion of said interconnection lead wire in one-shot molding of the housing.

6. An automotive combination switch comprising a switch unit, said switch unit housed in a case comprising:

a knob;

a pivotal axle provided on said knob to be coupled with a pivotal hole of a sliding element;

an operating element having a slant slit hole in a side wall surface, said slit hole is to be engaged slideably with a driving axle provided on said knob, said driving axle having a width, and a guide axle which is to be fitting to a guide groove provided in a horizontal direction in an inner side wall surface of said sliding element;

said sliding element coupled with said operating element and fitted to a guide rib of an intermediate cover to be slidable along said guide rib, said intermediate cover under said operating element;

a contact element attached to said sliding element; and a pattern provided on a printed board to be opened, and closed by said contact element.

7. The automotive combination switch of claim 6, wherein said operating element is provided with a groove having a U shape cross section extending in a circular arc form to be engaged with said guide axle of said sliding element.

8. The automotive combination switch of claim 6, wherein said operating element is provided with a guide hollow on said side wall surface having said slant slit hole so as to provide a span smaller than said width of said driving axle disposed in said knob.

* * * * *

UNITED STATES PATENT AND TRADEMARK OFFICE
CERTIFICATE OF CORRECTION

PATENT NO. : 6,172,314 B1
DATED : January 9, 2001
INVENTOR(S) : Uehira et al.

It is certified that error appears in the above-identified patent and that said Letters Patent is hereby corrected as shown below:

<u>Column 8,</u>
Line 7, "potion" should read -- portion --.

Signed and Sealed this

Twenty-ninth Day of January, 2002

Attest:

JAMES E. ROGAN
*Attesting Officer*  *Director of the United States Patent and Trademark Office*